US011835303B2

(12) United States Patent
Girmscheid et al.

(10) Patent No.: US 11,835,303 B2
(45) Date of Patent: Dec. 5, 2023

(54) HEAT TRANSFER DEVICE FOR TEMPERING BATTERIES AND COMPONENTS OF THE POWER ELECTRONICS

(71) Applicant: Hanon Systems, Daejeon (KR)

(72) Inventors: Felix Girmscheid, Cologne (DE); Gero Schoemaker, Cologne (DE); Mario Mielenhausen, Frechen (DE)

(73) Assignee: HANON SYSTEMS, Daejeon (KR)

( * ) Notice: Subject to any disclaimer, the term of this patent is extended or adjusted under 35 U.S.C. 154(b) by 681 days.

(21) Appl. No.: 16/662,270

(22) Filed: Oct. 24, 2019

(65) Prior Publication Data

US 2020/0132387 A1    Apr. 30, 2020

(30) Foreign Application Priority Data

Oct. 30, 2018 (DE) .......................... 102018127017.8

(51) Int. Cl.
*F28D 9/00* (2006.01)
*H01M 10/6554* (2014.01)
(Continued)

(52) U.S. Cl.
CPC ........... *F28D 9/005* (2013.01); *F28D 9/0093* (2013.01); *F28D 21/00* (2013.01);
(Continued)

(58) Field of Classification Search
CPC ........ F28D 9/005; F28D 9/0093; F28D 21/00; F28D 2021/008; F28D 1/0341;
(Continued)

(56) References Cited

U.S. PATENT DOCUMENTS 5,005,640 A * 4/1991 Lapinski .................. F28D 9/00
165/142
6,945,315 B1 * 9/2005 Gektin .................... F28D 15/00
165/104.31
(Continued)

FOREIGN PATENT DOCUMENTS

CN       107796143 A       3/2018
DE         4416236 A1      11/1995
(Continued)

*Primary Examiner* — Tho V Duong
(74) *Attorney, Agent, or Firm* — Shumaker, Loop & Kendrick, LLP; James D. Miller (57) ABSTRACT

A device for the transfer of heat to control the temperature of batteries and components of the power electronics, particularly for an electric vehicle or a hybrid vehicle, includes an inlet for a fluid and an outlet for the fluid as well as at least two fluid-conducting plate-shaped heat exchanger elements, of which a first plate-shaped heat exchanger element and a second plate-shaped heat exchanger element have planar contact with one another for the transfer of heat. In doing so, the second plate-shaped heat exchanger element is formed for planar contact with a heat transfer surface of a battery and/or a component of power electronics. At least one fluid connection is formed between the first plate-shaped heat exchanger element and the second plate-shaped heat exchanger element such that fluid escaping from the first plate-shaped heat exchanger element can flow through the second plate-shaped heat exchanger element.

7 Claims, 12 Drawing Sheets

(51) Int. Cl.
*H01M 10/6556* (2014.01)
*F28D 21/00* (2006.01)

(52) U.S. Cl.
CPC ... *H01M 10/6554* (2015.04); *H01M 10/6556* (2015.04); *F28D 2021/008* (2013.01)

(58) Field of Classification Search
CPC .............. F28D 1/035; H01M 10/6554; H01M 10/6556; F28F 3/12; H05K 7/20263; H05K 7/20254
USPC ........................................................ 165/80.4
See application file for complete search history.

(56) References Cited

U.S. PATENT DOCUMENTS

| | | | | |
|---|---|---|---|---|
| 7,522,643 B2* | 4/2009 | Miyajima | ........... | H01S 5/02423 372/36 |
| 8,120,914 B2* | 2/2012 | Kajiura | ................ | H01L 23/473 361/689 |
| 8,208,510 B2* | 6/2012 | Kawanishi | .......... | H01S 5/02423 438/122 |
| 9,638,475 B2 | 5/2017 | Burgers et al. | | |
| 10,833,378 B2 | 11/2020 | Nicholls | | |
| 2010/0202479 A1* | 8/2010 | Miyajima | ............. | H01L 23/473 165/185 |
| 2012/0263984 A1* | 10/2012 | Krammer | ................ | B60L 58/27 429/82 |
| 2015/0008065 A1* | 1/2015 | Fukawatase | ............. | B60T 1/14 180/274 |
| 2015/0023638 A1 | 8/2015 | Park et al. | | |
| 2016/0036104 A1* | 2/2016 | Kenney | ..................... | F28F 3/12 165/170 |
| 2016/0315365 A1* | 10/2016 | Vanderwees | ...... | H01M 10/6557 |
| 2018/0337434 A1* | 11/2018 | Burgers | ..................... | F28F 3/12 |
| 2019/0234695 A1* | 8/2019 | Vucenic | .............. | F28F 3/042 |
| 2019/0277578 A1* | 9/2019 | Bardeleben | ............ | F28D 1/0308 |
| 2019/0301809 A1* | 10/2019 | Cook | ......................... | F28F 3/12 |

FOREIGN PATENT DOCUMENTS

| | | |
|---|---|---|
| DE | 102012217869 A1 | 4/2014 |
| FR | 2898405 A1 | 9/2007 |
| KR | 20140026961 A | 3/2014 |
| KR | 20150096885 A | 8/2015 |
| KR | 20160111661 A | 9/2016 |
| WO | 2016168932 A1 | 10/2016 |
| WO | 2017136707 A1 | 8/2017 |

* cited by examiner

HEAT TRANSFER DEVICE FOR TEMPERING BATTERIES AND COMPONENTS OF THE POWER ELECTRONICS

CROSS-REFERENCE TO RELATED PATENT APPLICATION

This patent application claims the benefit of German Patent Application No. DE 10 2018 127 017.8 filed Oct. 30, 2018, the entire disclosure of which is hereby incorporated herein by reference.

FIELD

The invention relates to a device for transferring heat to control the temperature of batteries and components of power electronics. The invention is particularly suitable for controlling the temperature of a battery in components of the power electronics of an electric vehicle or a hybrid vehicle.

BACKGROUND

The trend of electrifying the drivetrain of vehicles poses new challenges for developers. Thus, temperatures below 40° C. are required for the cooling of batteries, such as lithium-ion batteries and the related power electronics of hybrid vehicles and electric vehicles. In order to achieve this even when a vehicle is stopped, active temperature control is required. Until now, heat exchangers with a flat cooling surface have been used to control the temperature of battery cells or electronic components. The heat exchangers are typically formed with fluid-conducting channels, wherein turbulators or fins are integrated between the fluid-conducting channels in order to ensure a good transfer of heat and torsional stiffness. The turbulators are preferably used to distribute the coolant as uniformly as possible in a flow channel. However, with the previously known devices for controlling the temperature of batteries and components of power electronics along the fluid-conducting channels, there is heating of the fluid being conducted in the channels, which results in a comparatively high temperature gradient of the fluid between the inlet and the outlet of a heat exchanger. Because particularly the cooling capacity of the fluid in the direction of the outlet of the heat exchanger and thus along the heat exchanger surface becomes less, this may result in damage to the batteries and the electronic components. For this reason, an option for reducing the temperature gradient of a fluid along the heat transfer surface of a battery or of a component of the power electronics is required.

SUMMARY

The object of the invention is to provide a device for the transfer of heat to control the temperature especially of batteries and components of the power electronics, particularly to control the temperature of a battery and components of the power electronics of an electric vehicle or of a hybrid vehicle, with which a temperature gradient of a heat transfer fluid can be reduced along a heat transfer surface.

The object is achieved by means of a device to transfer heat with the features according to the independent claims. Further refinements and design variants are indicated in the dependent claims.

The object is achieved by means of a device according to the invention for the transfer of heat to control the temperature of batteries and components of the power electronics, particularly for an electric vehicle or a hybrid vehicle. The device has an inlet and an outlet for the fluid as well as at least two fluid-conducting plate-shaped heat exchanger elements. In this case, a first plate-shaped heat exchanger element and a second plate-shaped heat exchanger element for transferring heat are arranged with planar contact with one another such that heat is transferred over the entire contact surface. The second plate-shaped heat exchanger element is additionally formed for planar contact with a heat transfer surface of a battery, a battery cell, and/or a component of power electronics. The second plate-shaped heat exchanger element is advantageously arranged between the first plate-shaped heat exchanger element and the battery, the battery cell, and/or the component of power electronics.

At least one fluid connection is formed between the first plate-shaped heat exchanger element and the second plate-shaped heat exchanger element such that fluid escaping from the first plate-shaped heat exchanger element can flow through the second plate-shaped heat exchanger element.

According to a further embodiment of the invention, the inlet for the fluid is formed at the first plate-shaped heat exchanger element and the outlet for the fluid is formed at the second plate-shaped heat exchanger element. In this case, the inlet of the fluid into the first plate-shaped heat exchanger element is advantageously arranged so as to lead through the second plate-shaped heat exchanger element.

The fluid being supplied via the inlet thus first flows through the first plate-shaped heat exchanger element before the fluid reaches the second plate-shaped heat exchanger element, which has contact with a heat transfer surface of the battery, the battery cell, and/or the component of power electronics.

Heat, which is transferred from the heat transfer surface of the battery, the battery cell, and/or the component of power electronics to the fluid flowing in the second heat exchanger element, can thus be transferred at least partially to the fluid flowing in the first heat exchanger element. Thus, the temperature difference of the fluid flowing through the device along the heat transfer surface is kept low in the second plate-shaped heat exchanger element such that a more uniform temperature control can be achieved.

The term "temperature control" should be understood as cooling or heating in terms of the invention. Thus, at high outside temperatures, the device according to the invention can be used for uniform cooling of the battery, the battery cell, and/or the component of power electronics. Furthermore, it is possible to use the device according to the invention for heating the battery, the battery cell, and/or the component of power electronics in order to ensure a desired operating temperature of the battery, of the battery cell, and/or of the component of power electronics at low outside temperatures.

According to a preferred design of the invention, the inlet of the fluid and the outlet of the fluid are arranged on a common side and thus on the same side of the device, or the inlet of the fluid and the outlet of the fluid are arranged at least in a spatial vicinity with respect to one another such that a high temperature of the fluid at the outlet can be transferred and discharged to the lower-temperature fluid at the inlet of the opposite first heat exchanger element via the contact surface between the first and the second heat exchanger element. The fluid at the outlet is thereby more strongly cooled such that advantageously a lower temperature gradient is achieved along the heat transfer surface of the battery, the battery cell, and/or the component of power electronics.

According to a further embodiment of the invention, the first plate-shaped heat exchanger element and the second plate-shaped heat exchanger element are formed from three profiled plates, which are flatly arranged with respect to one another and are connected to one another at least on the edge in a fluid-tight manner. In doing so, the profiles of the plates form hollow cavities as fluid flows between the plates. The term "fluid flow" should be understood as a fluid-conducting channel, which is formed on the interior of the plate-shaped heat exchanger elements. In an especially space-saving manner, the inlet, the outlet, and the at least one fluid connection may be formed between the plate-shaped heat exchanger elements by means of passages in the plates.

An advantage of the invention is that the first plate-shaped heat exchanger element is formed from a first plate and a second plate, and the second plate-shaped heat exchanger element is formed from the second plate and a third plate. Thus, the second plate represents a connection and a heat transfer surface between the plate-shaped heat exchanger elements.

According to a first alternative design of the invention, the fluid connection between the flatly contacted plate-shaped heat exchanger elements and/or fluid flows within the flatly contacted plate-shaped heat exchanger elements are designed such that the fluid within the fluid flow of the first plate-shaped heat exchanger element is directed in counter-flow opposite the fluid flow in the second plate-shaped heat exchanger element.

The fluid flows in the first plate-shaped heat exchanger element and in the second heat exchanger element may each be formed with a single channel, which extends over the entire inner cross-section of the respective heat exchanger element.

According to a second alternative design of the invention, the fluid connection between the flatly contacted plate-shaped heat exchanger elements and/or fluid flows within the flatly contacted plate-shaped heat exchanger elements are designed such that the fluid within the fluid flow of the first plate-shaped heat exchanger element is directed in parallel flow opposite the fluid flow in the second plate-shaped heat exchanger element.

It has been shown that with the design of the device with parallel flow of the fluid flows, a very low and constant temperature gradient is achieved between the first plate-shaped heat exchanger element and the second plate-shaped heat exchanger element.

The fluid flows within the first plate-shaped heat exchanger element and within the second plate-shaped heat exchanger element may each be formed as a channel, which has a U shape.

The at least one fluid connection between the first plate-shaped heat exchanger element and the second plate-shaped heat exchanger element is advantageously arranged within the common contact surface in a space-saving manner. The fluid connection is preferably formed on the outer edge of the flatly contacted plate-shaped heat exchanger elements in order to ensure the largest possible heat transfer surface between the first plate-shaped heat exchanger element and the second plate-shaped heat exchanger element.

The at least one fluid connection between the flatly contacted plate-shaped heat exchanger elements is preferably formed in the shape of a slot formed on the sides facing inward between the flatly contacted plate-shaped heat exchanger elements. The slot in this case advantageously extends over the entire width of the respective fluid flows. Consequently, the fluid flows over the entire width of the channel from the first plate-shaped heat exchanger element to the second plate-shaped heat exchanger element. Within the slot, at least one throttle element may be arranged as a connection of the fluid flows within the first and the second plate-shaped heat exchanger element in order to uniformly distribute a fluid current over the width of the fluid flow. The throttle element is used to influence the fluid current and may be formed with passages in the shape of, for example, punched round holes, slotted holes, oval holes, or slots. Furthermore, the throttle element may be formed as an insert element, such as a perforated plate, fins, or a corrugated plate with slots. The throttle element may likewise be produced by means of milling and/or turning.

According to an alternative design of the invention, the at least one fluid connection is formed as an additional connecting line between the first plate-shaped heat exchanger element and the second plate-shaped heat exchanger element, wherein the connections for the connecting line are preferably arranged at the edge of the plate-shaped heat exchanger elements, orthogonal to the contact surface, and between the first plate-shaped heat exchanger element and the second plate-shaped heat exchanger element.

According to a further design of the invention, multiple fluid connections are distributed over the common contact surface between the first plate-shaped heat exchanger element and the second plate-shaped heat exchanger element such that the fluid overflows selectively from the first plate-shaped heat exchanger element into the second plate-shaped heat exchanger element. The multiple dispersedly arranged fluid connections have proven to be particularly advantageous when temperature spikes occur in the area of the heat transfer surface of the second plate-shaped heat exchanger element with respect to the battery, the battery cell, and/or the component of power electronics, because such temperature spikes can be compensated due to the lower-temperature fluid flowing locally into the second plate-shaped heat exchanger element.

In order to keep the temperature gradients in the first plate-shaped heat exchanger element as low as possible from the inlet of fluid to the fluid connection and to ensure a uniform distribution of the fluid in the first plate-shaped heat exchanger element, the fluid flow in the first plate-shaped heat exchanger element may be formed with turbulators and/or conductive elements.

In addition, the fluid flow in the second plate-shaped heat exchanger element may have turbulators and/or conductive elements in order to also keep the temperature gradients in the second plate-shaped heat exchanger element as low as possible from the fluid connection to the outlet of the fluid and to ensure a uniform distribution of the fluid in the second plate-shaped heat exchanger element.

A connection of the device, particularly of the second plate-shaped heat exchanger element, to the heat transfer surface of the battery and/or of the component of power electronics can be implemented through bonding, pressing, soldering, or sintering.

The inlet and the outlet for the fluid may be arranged on a contact side with the heat transfer surface of a battery and/or of a component of power electronics at the second plate-shaped heat exchanger element. The inlet and the outlet are advantageously formed on the edge such that no perforations leading outward are necessary in the surfaces of the plate-shaped heat exchanger elements. According to an alternative design, the inlet and the outlet for the fluid are arranged on a side facing away from the heat transfer surface of a battery and/or of a component of power electronics at the first plate-shaped heat exchanger element.

According to a further preferred design of the invention, the first plate-shaped heat exchanger element or the second plate-shaped heat exchanger element is formed for planar contact with a heat transfer surface of a battery, a battery cell, and/or a component of power electronics. Thus, the outer surface of the first plate-shaped heat exchanger element or the outer surface of the second plate-shaped heat exchanger element may have contact with a heat transfer surface of a battery, a battery cell, and/or a component of power electronics, wherein the flow direction of the fluid should be adapted accordingly.

The fluid flows formed in the first plate-shaped heat exchanger element and in the second plate-shaped heat exchanger element may be formed as a channel, which has a zigzag shape or a double U shape.

According to a further design of the invention, the at least two fluid-conducting plate-shaped heat exchanger elements are each formed with at least two flat tubes, wherein flat tubes of the first plate-shaped heat exchanger element and flat tubes of the second plate-shaped heat exchanger element have planar contact with one another for the transfer of heat. At the ends, the flat tubes are connected to one another such that the fluid exiting from the flat tubes of the first plate-shaped heat exchanger element can flow through the second plate-shaped heat exchanger element. In doing so, the terminal connections between the flat tubes may be formed by means of collectors such that fluid can flow through the flat tubes in counterflow. Furthermore, it may be provided that the at least two fluid-conducting plate-shaped heat exchanger elements can each be extended with at least one further flat tube, wherein separating elements are arranged in the terminal collectors, which connect the flat tubes to one another, said separating elements enabling a flow in a desired direction. In this manner, various flow paths of the fluid flow can be implemented.

It has been shown that a reduction of the temperature gradient along the heat transfer surface of the battery, the battery cell, and/or the component of power electronics can be achieved with the device according to the invention with the same fluid flow. If a reduction in the temperature gradient along the heat transfer surface of the battery, the battery cell, and/or the component of power electronics is not necessary, an equivalent temperature-control capacity can be achieved with reduced fluid flow, whereby energy can be saved in existing systems. With new designs, smaller pumps can be provided to convey the fluid. The device according to the invention can advantageously be integrated into an existing temperature-control system in a simple manner, in which the inlet and the outlet are connected to the fluid-conducting lines of the existing temperature-control system according to the flow direction of the fluid being conveyed.

DRAWINGS

Further details, features, and advantages of embodiments of the invention result from the following description of exemplary embodiments with reference to the corresponding drawings. The following is shown.

Recurring features have been given equivalent reference numerals in the figures.

DETAILED DESCRIPTION

Figure 1:
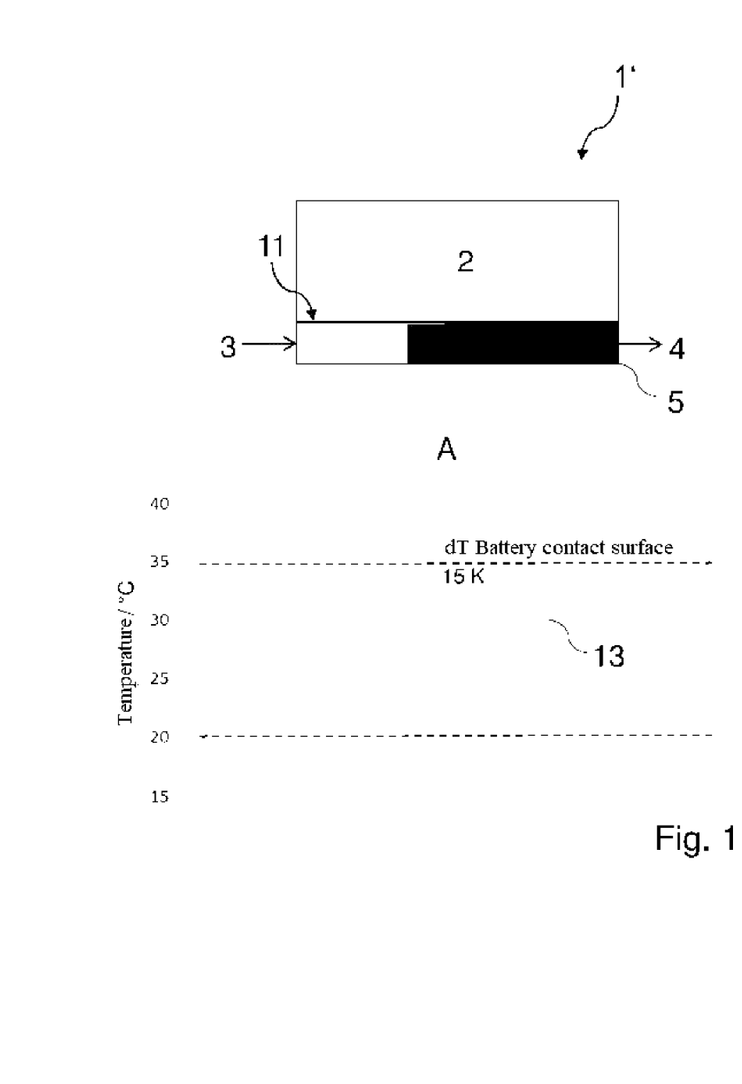
FIG. 1: a schematic representation of a device known in the prior art for the transfer of heat for the temperature control of a battery as well as a temperature profile diagram A.

FIG. 1 shows a schematic representation of a device 1' known in the prior art for the transfer of heat for the temperature control of a battery 2 with a plate-shaped heat exchanger 5 having an inlet 3 for a fluid and an outlet 4 for the fluid. The arrows indicate the flow direction of the fluid.

The increase 13 shown in temperature profile diagram A corresponds to the temperature increase along the heat transfer surface 11 between the battery 2 and the heat exchanger 5. The temperature difference of the fluid between the inlet 3 and the outlet 4 is 15 K.

Figure 2:
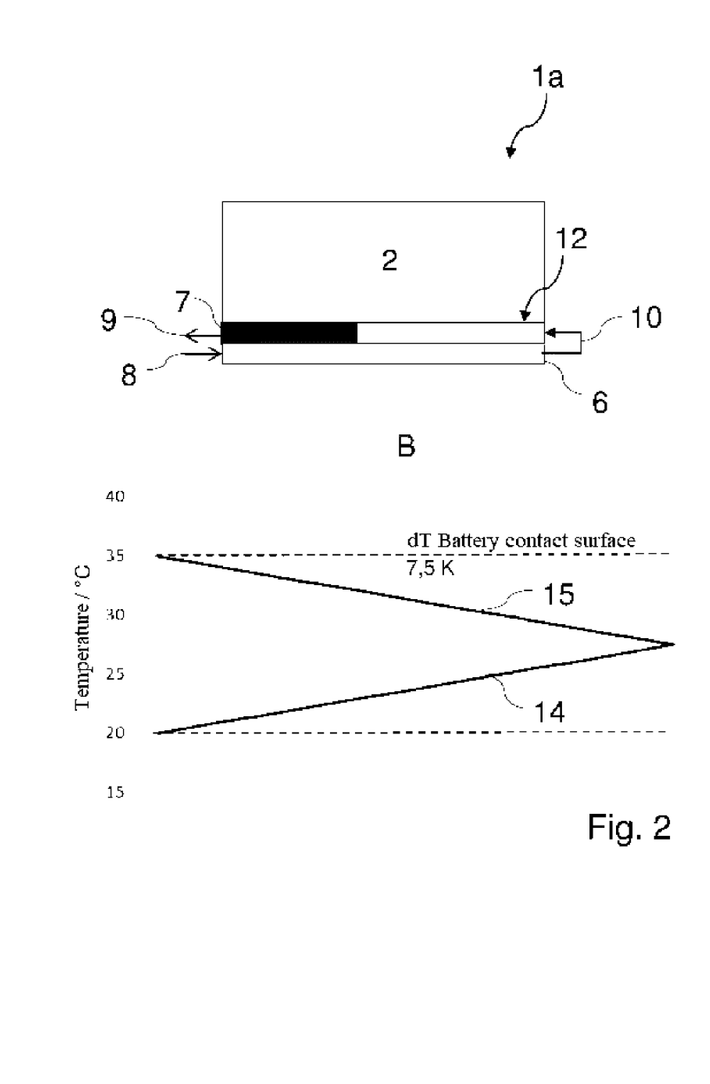
FIG. 2: a schematic representation of a first exemplary embodiment of a device for the transfer of heat for the temperature control of a battery with a temperature profile diagram B.

FIG. 2 shows a schematic representation of a device 1a for the transfer of heat for the temperature control of a battery 2 as a first exemplary embodiment with a temperature profile diagram B. In contrast to device 1' from FIG. 1, device 1a has two fluid-conducting plate-shaped heat exchanger elements 6, 7, of which one first plate-shaped heat exchanger element 6 and one second plate-shaped heat exchanger element 7 have planar contact with one another for the transfer of heat, wherein the second plate-shaped heat exchanger element 7 is formed to have planar contact with a heat transfer surface 12 of the battery 2. Furthermore, the second plate-shaped heat exchanger element 7 may also be formed for planar contact with a heat transfer surface of a component of power electronics. An inlet 8 for the fluid is provided at the first plate-shaped heat exchanger element 6. An outlet 9 for the fluid is formed at the second plate-shaped heat exchanger element 7, wherein a fluid connection 10 is formed between the first plate-shaped heat exchanger element 6 and the second plate-shaped heat exchanger element 7, such that fluid from the first plate-shaped heat exchanger element 6 can flow through the second plate-shaped heat exchanger element 7. The inlet 8 and the outlet 9 are formed on a common side of the assembly such that heat of the fluid heated at the outlet 9 can be discharged to the still low-temperature fluid flowing inward by means of the contact surface between the first plate-shaped heat exchanger element 6 and the second plate-shaped heat exchanger element 7. The discharging of a part of the heat from the second plate-shaped heat exchanger element 7 to the first plate-shaped heat exchanger element 6 enables a cooling of the fluid in the second plate-shaped heat exchanger element 7 such that a lower temperature gradient can be achieved along the heat transfer surface 12.

Temperature profile diagram B shows the temperature profile in the first plate-shaped heat exchanger element 6 with the increase 14 and the temperature profile in the second plate-shaped heat exchanger element 7 with the increase 15. As indicated by the increase 15, the temperature increase along the heat transfer surface 12 is only 7.5 K as compared to the design described with FIG. 1, with the same fluid flow. The temperature difference of the fluid between the inlet 8 and the outlet 9 is then 15 K.

In the example shown, the fluid in the first plate-shaped heat exchanger element 6 is guided in counterflow opposite the fluid flow in the second plate-shaped heat exchanger element 7.

Figure 3:
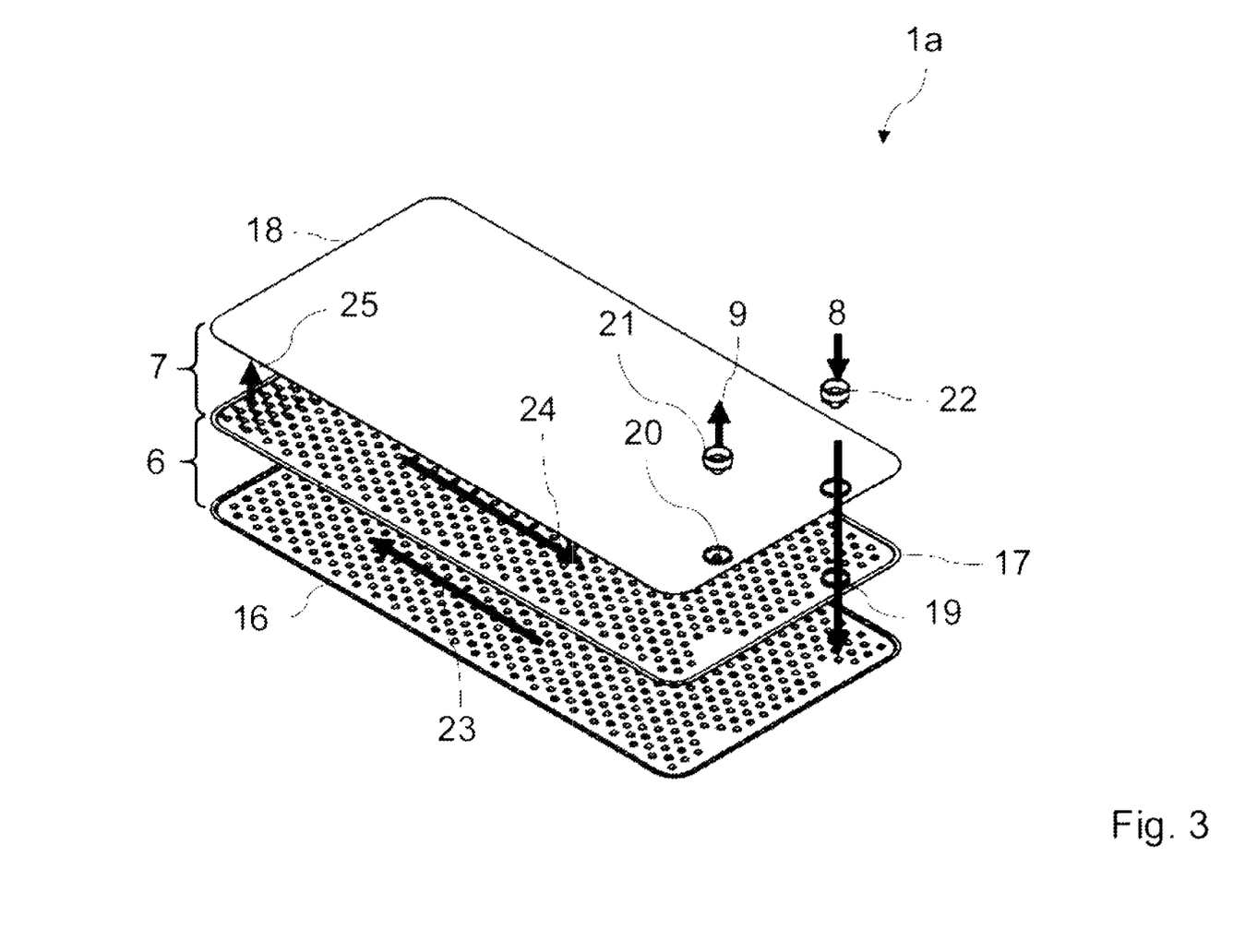
FIG. 3: the device from FIG. 2 in an exploded view.

FIG. 3 shows device 1a from FIG. 2 for the transfer of heat in an exploded view. The first plate-shaped heat exchanger element 6 and the second plate-shaped heat exchanger element 7 are formed from three profiled plates 16, 17, 18.

In this case, the first plate-shaped heat exchanger element 6 is formed by a first plate 16 and a second plate 17, wherein, due to a profiling of the plates 16, 17, a contiguous cavity is formed between the plates 16, 17, said cavity enabling a uniform fluid flow 23 of the fluid fed through the inlet 8 by means of the first plate-shaped heat exchanger element 6. The second plate-shaped heat exchanger element 7 is formed by the second plate 17 and a third plate 18, wherein, due to a profiling of the plates 17, 18, a contiguous cavity is formed between the plates 17, 18, said cavity enabling a uniform fluid flow 24 through the second plate-shaped heat exchanger element 7 to the outlet 9.

To ensure flow of the fluid through the inlet 8 and the second plate-shaped heat exchanger element 7 into the first plate-shaped heat exchanger element 6, a passage 19 is formed by the second, middle plate 17 and the third plate 18, said passage being sealed off to the fluid flow 24 of the second plate-shaped heat exchanger element 7 with an inlet port 22. In the assembled state of the plates 16, 17, 18, the inlet port 22 is arranged inserted in the passage 19.

The outlet 9 of the fluid is formed with a passage 20 by means of the third plate 18 and an outlet port 21, wherein the outlet port 21 is inserted in the passage 20, in the assembled state of the plates 16, 17, 18.

The fluid flows from the first plate-shaped heat exchanger element 6 into the second plate-shaped heat exchanger element 7 by means of a fluid connection 25 formed between the first plate-shaped heat exchanger element 6 and the second plate-shaped heat exchanger element 7. The fluid connection 25 is preferably formed as a slot, which extends over the entire width of the fluid flows 23, 24 and thus of the plate-shaped heat exchanger elements 6, 7.

In addition, the fluid flows 23, 24 each characterize the flow direction of the fluid within the plate-shaped heat exchanger elements 6, 7. With the embodiment of device 1a from FIG. 3, the fluid in the fluid flow 23 is guided through the first plate-shaped heat exchanger element 6 in counterflow opposite the fluid flow 24 in the second plate-shaped heat exchanger element 7.

Figure 4A:
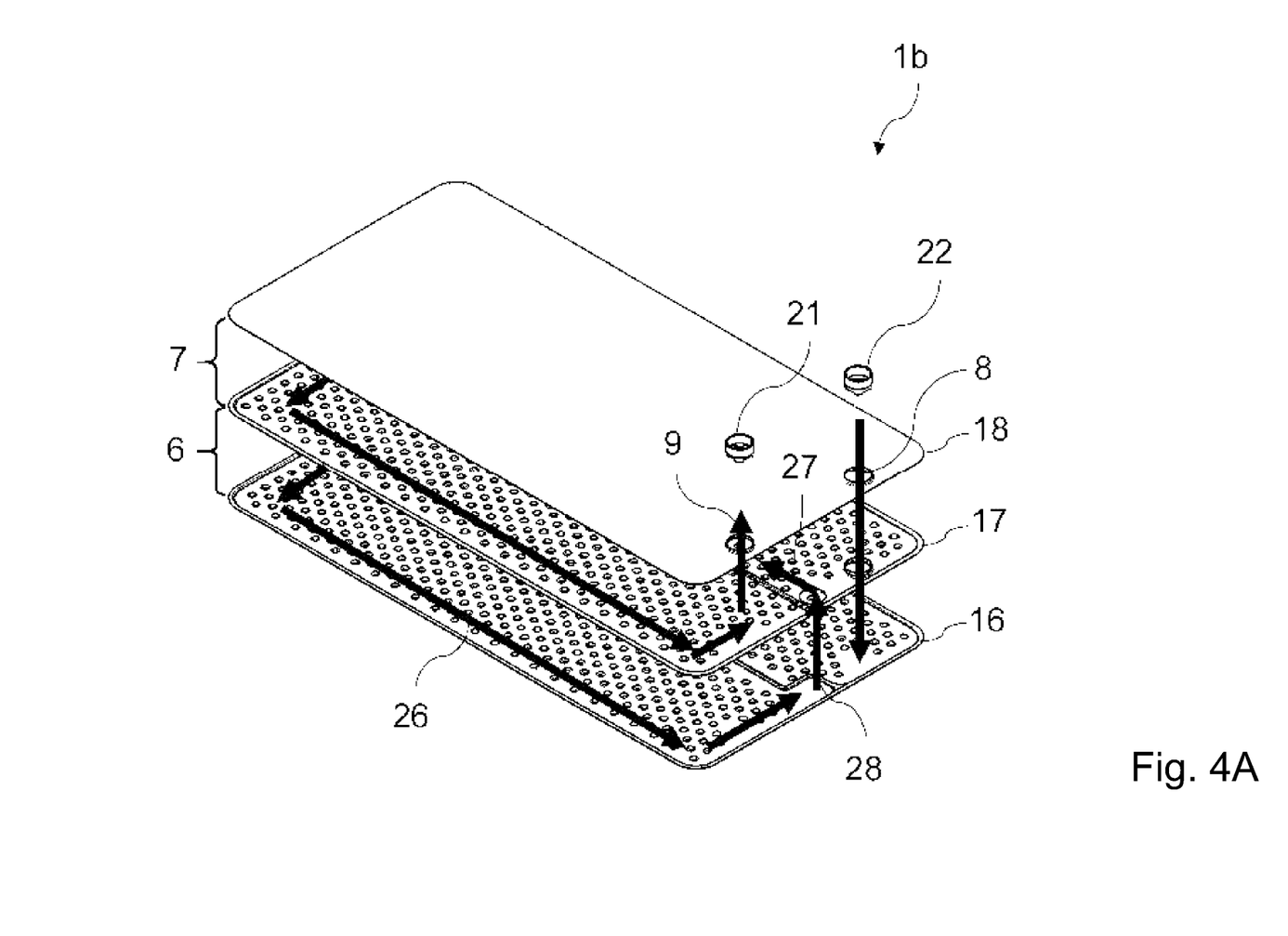
FIG. 4A: a schematic exploded view of a second exemplary embodiment of the device for the transfer of heat.

FIG. 4A shows a schematic exploded view of a device 1b for the transfer of heat for the temperature control of a battery 2 as a second exemplary embodiment.

In contrast to device 1a shown in FIG. 3, fluid flow 26 is guided through the first plate-shaped heat exchanger element 6 and fluid flow 27 is guided through the second plate-shaped heat exchanger element 7 of the device 1b in parallel flow. Fluid flows 26, 27 are each formed in a U shape.

As previously shown with the embodiment according to FIG. 3, the fluid is guided through the inlet 8 and the second plate-shaped heat exchanger element 7 into the first plate-shaped heat exchanger element 6 and flows, in U-shaped fluid flow 26, through the first plate-shaped heat exchanger element 6. By means of the profiling of plates 16, 17, a contiguous cavity is formed between plates 16, 17, said cavity forming a separating wall in the middle area of plates 16, 17, said separating wall extending in the longitudinal direction of plates 16, 17 and providing an overflow area for the fluid at the longitudinal-side ends of plates 16, 17. The inlet 8 of the fluid into the first plate-shaped heat exchanger element 6 and the outlet of the fluid from the first plate-shaped heat exchanger element 6 are formed on a common narrow side, separated from one another and sealed off to one another.

The fluid flows from the first plate-shaped heat exchanger element 6 into the second plate-shaped heat exchanger element 7 by means of a fluid connection 28 formed between the first plate-shaped heat exchanger element 6 and the second plate-shaped heat exchanger element 7. Fluid connection 28 is formed as an outlet of the fluid from the first plate-shaped heat exchanger element 6 in the area of the inlet 8 such that the fluid in U-shaped fluid flow 27 flows through the second plate-shaped heat exchanger element 7, which substantially corresponds in direction and dimension to U-shaped fluid flow 26 of the first plate-shaped heat exchanger element 6. By means of the profiling of plates 17, 18, a contiguous cavity is likewise formed between plates 17, 18, said cavity forming a separating wall in the middle area of plates 17, 18, said separating wall extending in the longitudinal direction of plates 17, 18 and providing an overflow area for the fluid at the longitudinal-side end of plates 17, 18, said longitudinal-side end facing away from the inlet 8 and the outlet 9. The inlet of the fluid into the second plate-shaped heat exchanger element 7 and the outlet 9 of the fluid from device 1b are formed on a common narrow side, separated from one another and sealed off to one another.

Figure 4B:
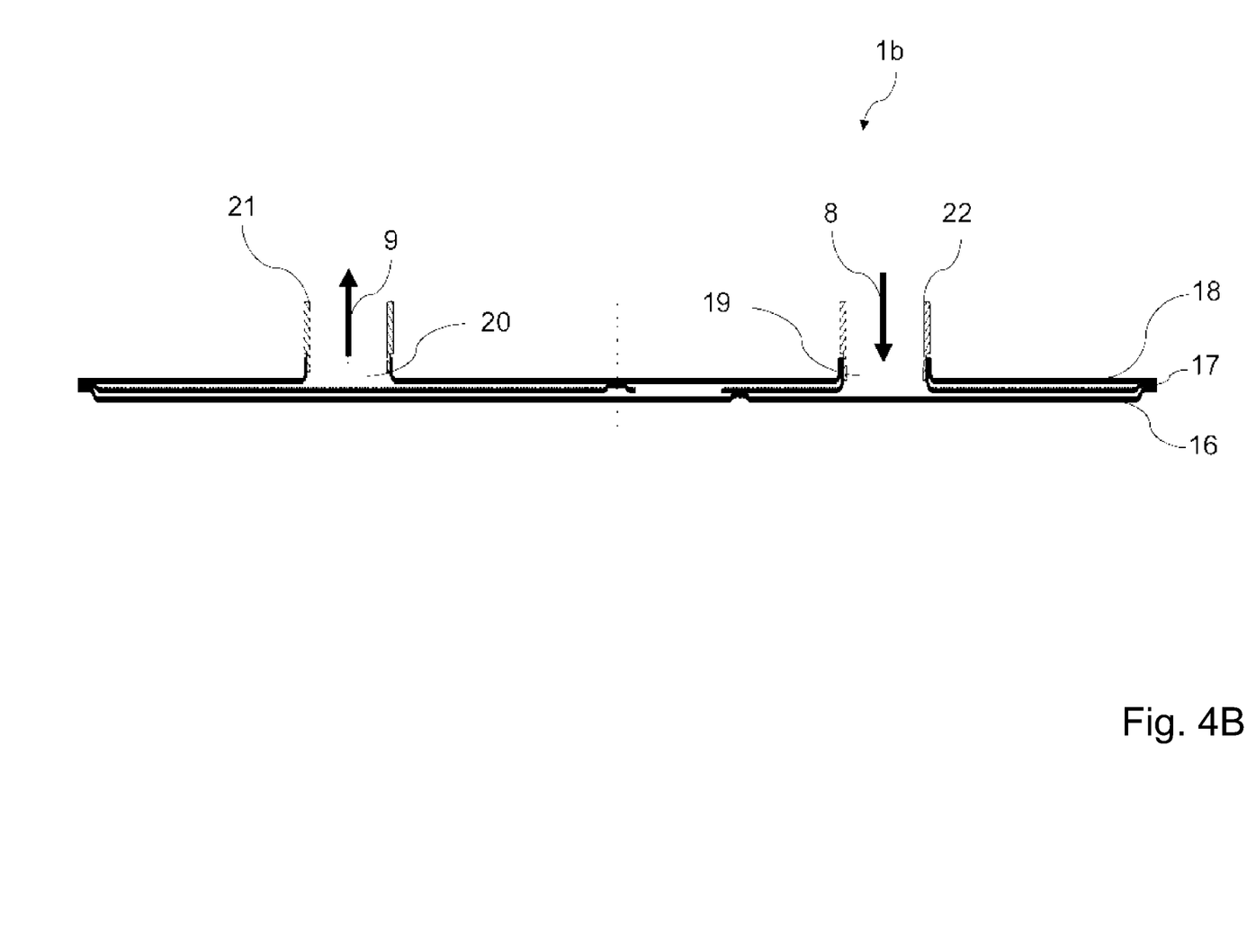
FIG. 4B: a schematic sectional view of the second exemplary embodiment of the device for the transfer of heat from FIG. 4a in the assembled state.

FIG. 4B shows a schematic sectional view of the second exemplary embodiment of device 1b for the transfer of heat in the assembled state. The profiled plates 16, 17, 18 are connected to one another on the edge in a fluid-tight manner. The inlet port 22 is arranged inserted in the passage 19 such that a fluid connection is formed by the inlet 8 into the first plate-shaped heat exchanger element 6. The outlet 9 of the fluid is formed with a passage 20 by means of the third plate 18 and an outlet port 21, wherein the outlet port 21 is arranged inserted in the passage 20. Contiguous cavities are formed as fluid flows between the profiled plates 16, 17, 18.

Figure 5:
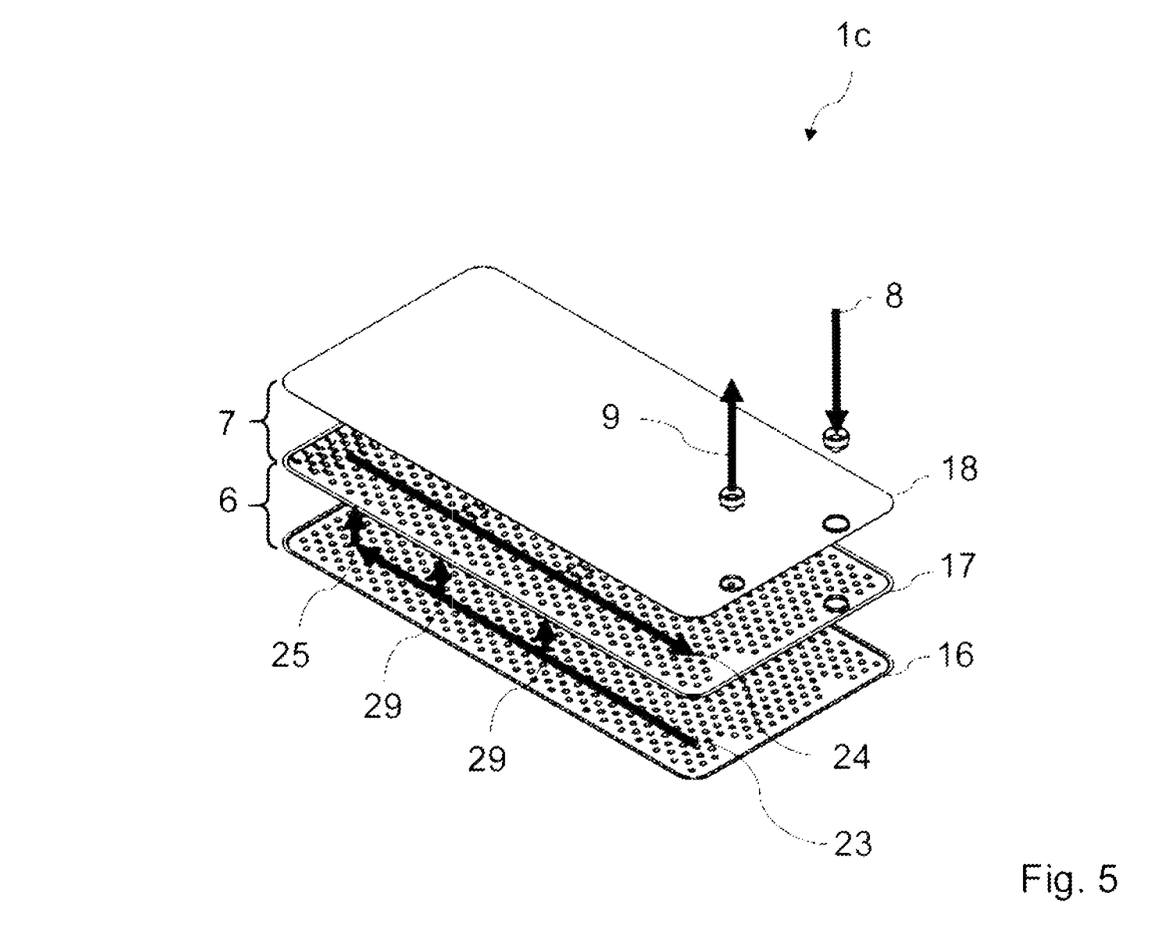
FIG. 5: a schematic exploded view of a third exemplary embodiment of the device for the transfer of heat.

FIG. 5 shows a device 1c for the transfer of heat for the temperature control of a battery 2 as a third exemplary embodiment.

In contrast to device 1a shown in FIG. 3, a plurality of additional fluid flows 29 are formed along fluid flows 23, 24 within the middle plate 17 between the first plate-shaped heat exchanger element 6 and the second plate-shaped heat exchanger element 7. A plurality in this case is understood to be a number of at least two. The fluid connections 29 formed as passages and arranged distributed over the surface of the plate 17 additionally enable a selective overflow of the fluid from the first plate-shaped heat exchanger element 6 to the second plate-shaped heat exchanger element 7.

The three profiled plates 16, 17, 18 of devices 1*a*, 1*b*, 1*c* are each dimensioned according to the requirements such that the material and the thickness of plates 16, 17, 18 may vary from one another in order to discharge the necessary heat from a heat source. In doing so, particularly the second plate 17 may differ from the first plate 16 and the third plate 18, especially in the wall thickness.

In addition, instead of the second plate-shaped heat exchanger element 7, the first plate-shaped heat exchanger element 6 of device 1*a*, 1*b*, 1*c* may have the contact surface for having planar contact with the heat transfer surface 12 of the battery 2 such that the contact surface is formed on the opposite side of device 1*a*, 1*b*, 1*c*.

Figure 6:
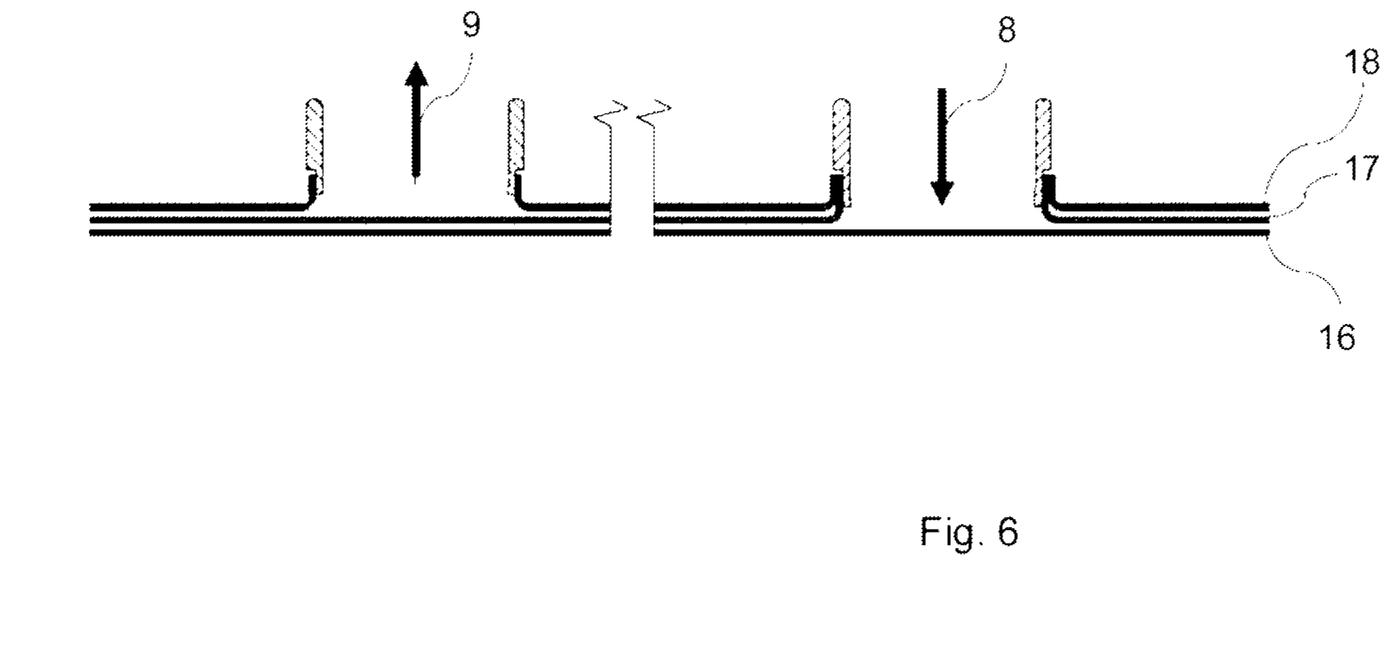
FIG. 6: a schematic sectional view of an arrangement of the connections for the fluid.

FIG. 6 shows a schematic sectional view of an arrangement of connections for the inlet 8 and the outlet 9 of the fluid. The connection between plates 16, 17, 18, the inlet port 22, and the outlet port 21 may be formed through insertion into each other. In addition, plates 16, 17, 18, the inlet port 22, and the outlet port 21 may be soldered together.

Figure 7:
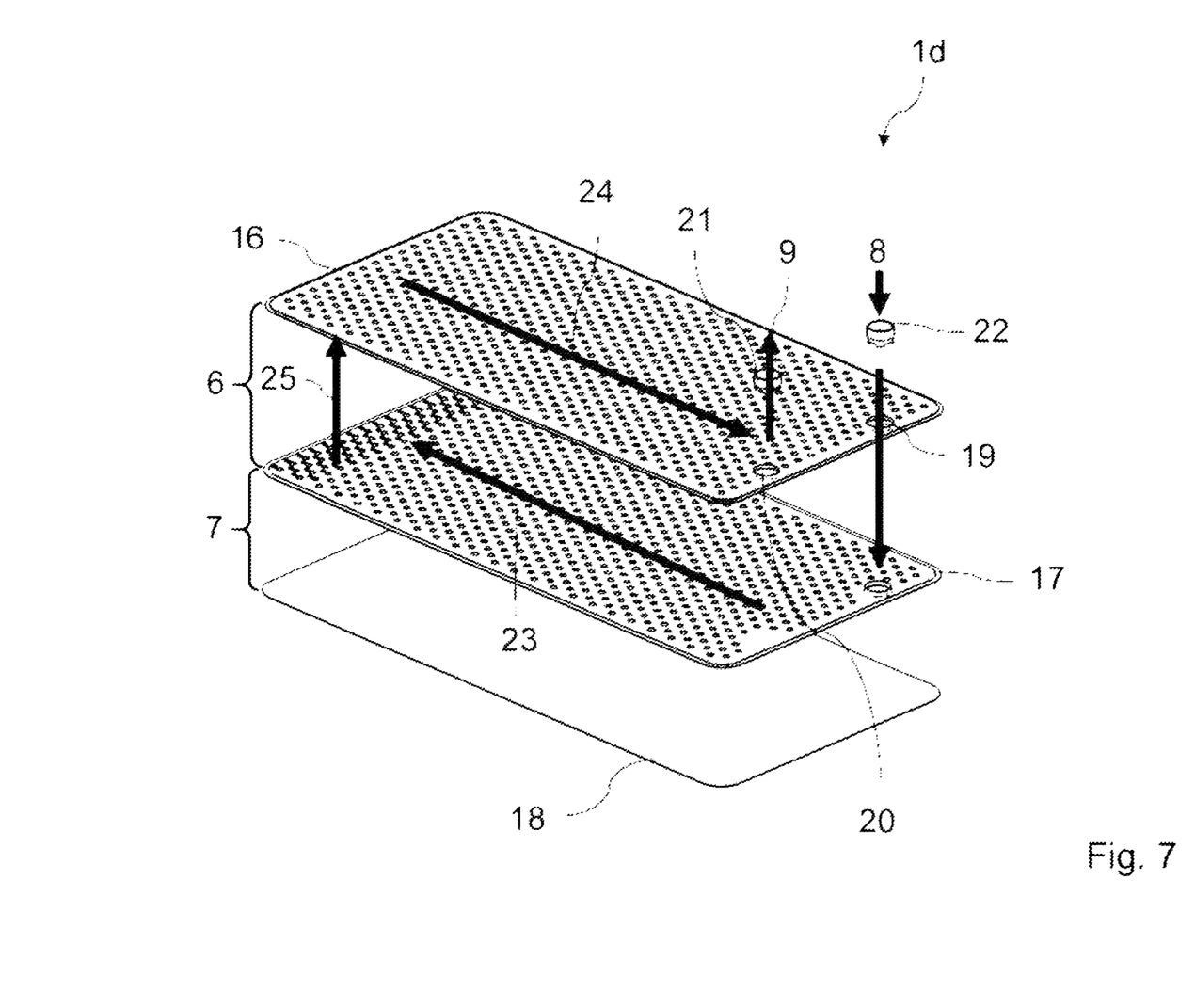
FIG. 7: a schematic exploded view of a fourth exemplary embodiment of the device for the transfer of heat.

FIG. 7 shows a device 1*d* as a schematic exploded view of a fourth exemplary embodiment, wherein the inlet 8 and the outlet 9 for the fluid are arranged on a side facing away from the heat transfer surface of a battery 2 and/or of a component of power electronics at the first plate-shaped heat exchanger element 6. In contrast to devices 1*a*, 1*b*, and 1*c*, the inlet 8 is formed in the first plate 16 as well as the second plate 17, and the outlet 9 for the fluid is formed in the first plate 16. In doing so, the inlet port 22 is arranged inserted in the passage 19, which is provided in the first plate 16, such that a fluid connection is formed by the inlet 8 into the second plate-shaped heat exchanger element 7. The outlet 9 of the fluid is formed with a passage 20 by means of the first plate 16 and an outlet port 21, wherein the outlet port 21 is arranged inserted in the passage 20. Contiguous cavities are provided as fluid flows between profiled plates 16, 17, 18.

Figure 8:
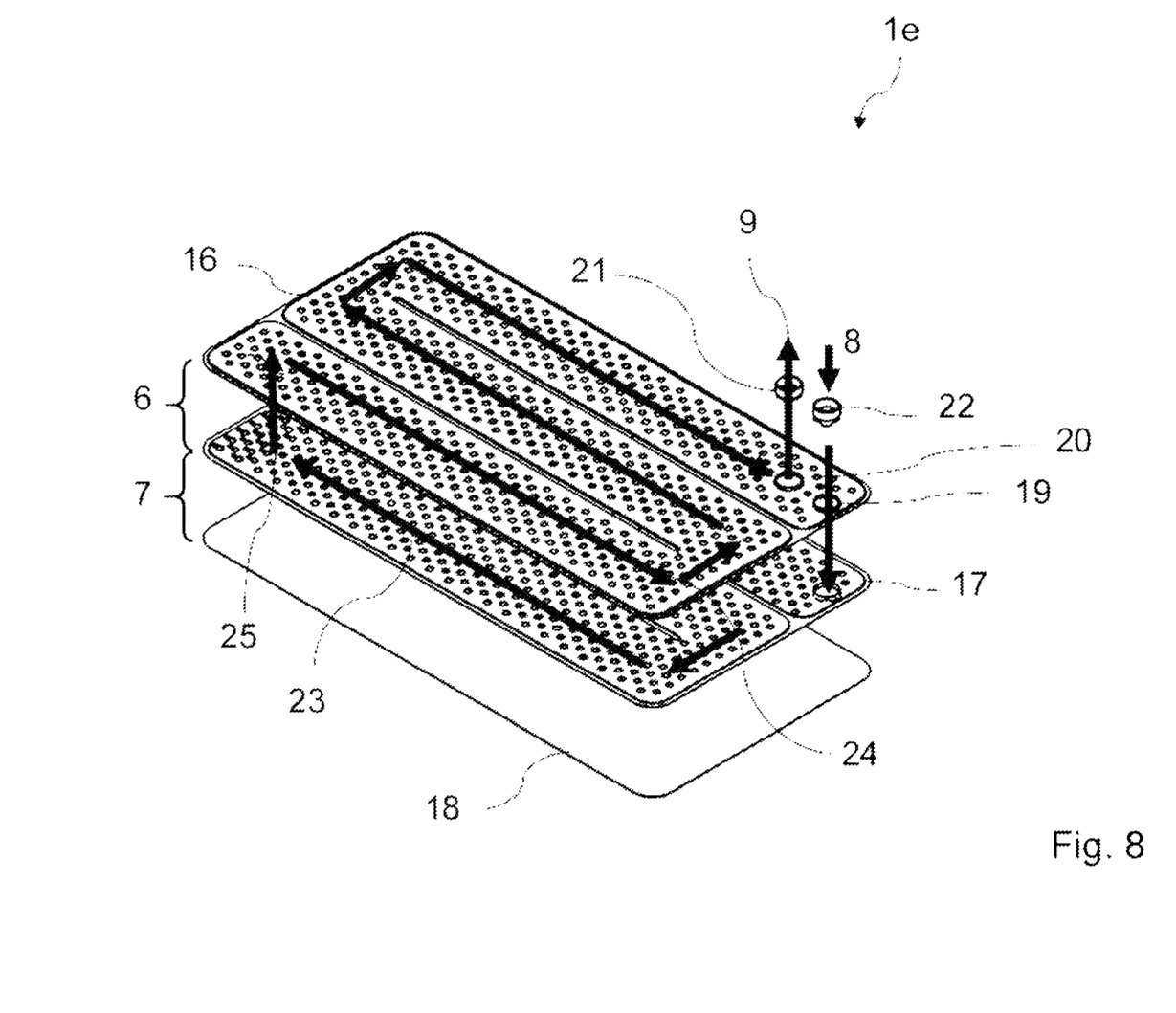
FIG. 8: a schematic exploded view of a fifth exemplary embodiment of the device for the transfer of heat.

FIG. 8 shows a device 1*e* as a schematic exploded view of a fifth exemplary embodiment, wherein this is a refinement of device 1*d* shown in FIG. 7. The inlet 8 and the outlet 9 for the fluid are each arranged in a corner area of the rectangular heat exchanger assembly formed from plates 16, 17, 18. With this embodiment, fluid channels, which divert the flow path for the fluid in each of the heat exchanger elements 6, 7 at least twice, are formed within the heat exchanger elements 6, 7 such that a meandering or zigzag-shaped fluid flow 23, 24 is formed.

Figure 9:
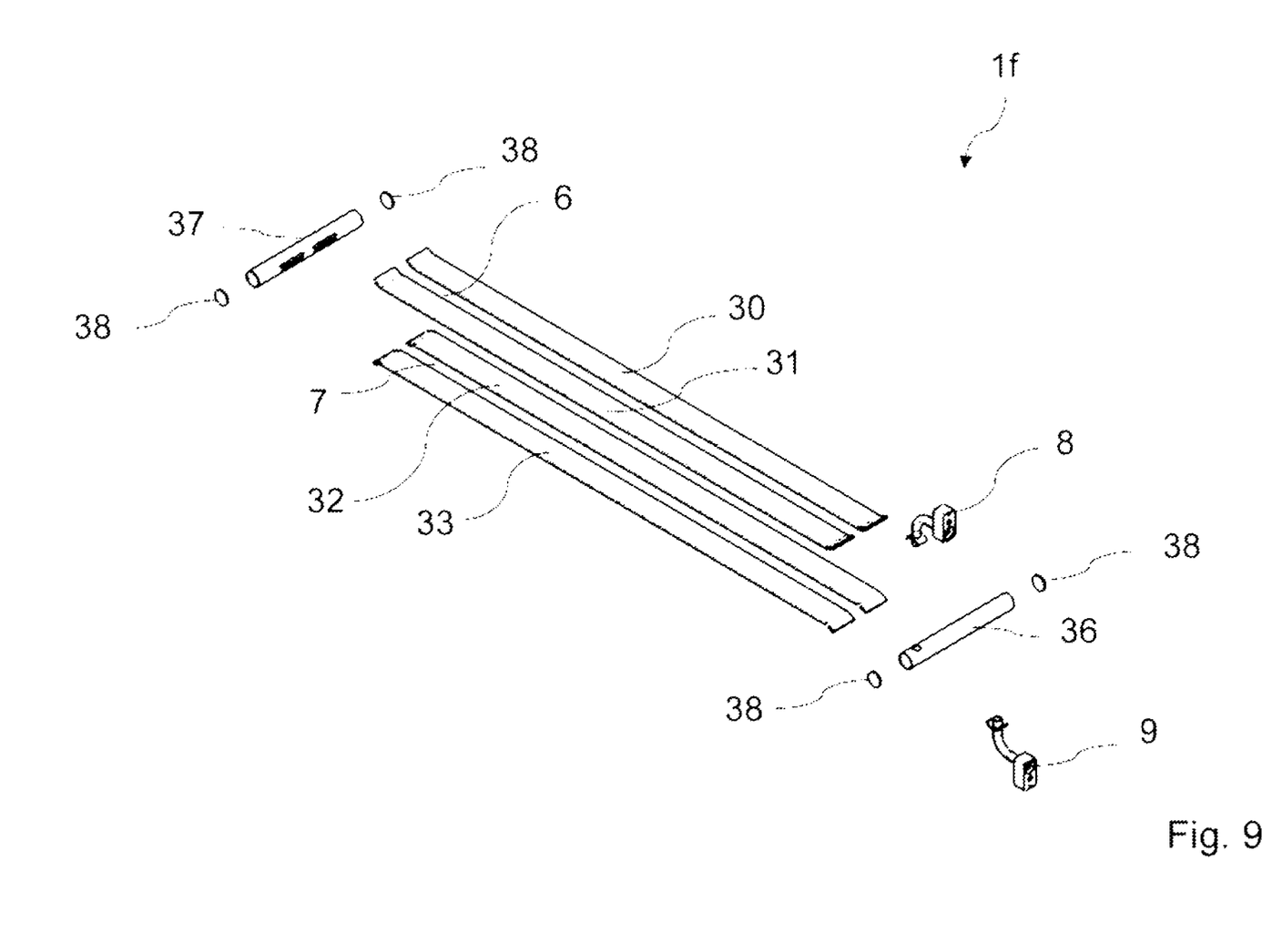
FIG. 9: a schematic exploded view of a sixth exemplary embodiment of the device for the transfer of heat.

FIG. 9 shows a schematic exploded view of a sixth exemplary embodiment with a device 1*f*, in which the heat exchanger elements 6, 7 are each formed from two flat tubes 30, 31, 32, 33, in contrast to devices 1*a* to 1*e*. The flat tube of the first plate-shaped heat exchanger element 6 formed from flat tubes 30, 31 and the flat tube 32 of the second plate-shaped heat exchanger element 7 formed from flat tubes 32, 33 have respective planar contact with one another, just as flat tubes 31, 33 of the heat exchanger elements 6, 7, for the transfer of heat.

At the ends, the flat tubes 30, 31, 32, 33 are each arranged inserted in a tube-shaped collector 36, 37 such that the inner volumes of the flat tubes 30, 31, 32, 33 and the collectors 36, 37 are connected to one another. The first collector 36 has two chambers separated from one another, wherein a first chamber is connected to the inlet 8 such that fluid fed through the inlet 8 initially flows into the first chamber. Starting from the first chamber, the fluid flows through two flat tubes 30, 31 of the first plate-shaped heat exchanger element 6 to the second collector 37, which only has one chamber, which connects the inner volumes of flat tubes 30, 31 of the first plate-shaped heat exchanger element 6 to the inner volumes of flat tubes 32, 33 of the second plate-shaped heat exchanger element 7 such that the fluid flowing out of the first plate-shaped heat exchanger element 6 flows into the second plate-shaped heat exchanger element 7. Flat tubes 32, 33 of the second plate-shaped heat exchanger element 7 exit into a second chamber of the first collector 36, which is connected to the outlet 9.

The tube-shaped collectors 36, 37 are each sealed off laterally with end elements 38 in a fluid-tight manner.

Figure 10:
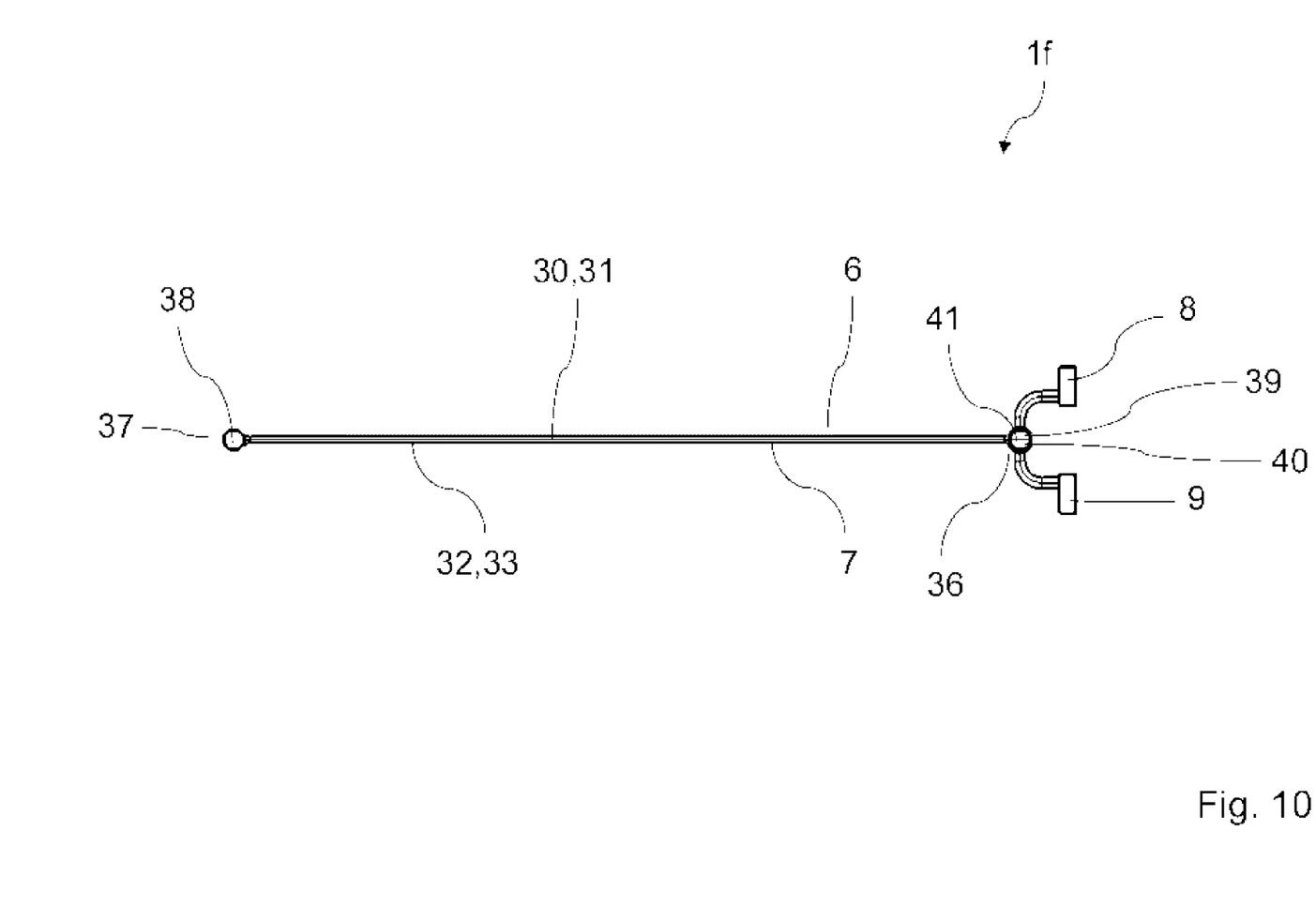
FIG. 10: a schematic representation of a side view of the sixth exemplary embodiment of the device for the transfer of heat from FIG. 9 in the assembled state.

FIG. 10 shows a schematic representation of a side view of device 1*f* shown in FIG. 9 in an assembled state. Device 1*f* shown in FIGS. 9 and 10 develops from FIG. 11 in a perspective view. The first plate-shaped heat exchanger element 6 and the second plate-shaped heat exchanger element 7, particularly flat tubes 30, 31 of the first plate-shaped heat exchanger element 6 and flat tubes 32, 33 of the second plate-shaped heat exchanger element 7, have planar contact with one another for the transfer of heat. The second plate-shaped heat exchanger element 7 is additionally formed for planar contact with a heat transfer surface of a battery 2 and/or a component of power electronics. The first collector 36, shown here on the front face without the end element 38 and thus open, has the first chamber 39, which connects the inlet 8 and the inner volumes of flat tubes 30, 31 of the first plate-shaped heat exchanger element 6 to one another. The fluid fed through the inlet 8 into device 1*f* thus flows through flat tubes 30, 31 of the first plate-shaped heat exchanger element 6 into the second collector 37, in which the flow direction of the fluid is diverted and the fluid flows into flat tubes 32, 33 of the second plate-shaped heat exchanger element 7. The second chamber 40, formed in the first collector 36, connects flat tubes 32, 33 of the second plate-shaped heat exchanger element 7 to the outlet 9 such that fluid can be discharged from device 1*f* through flat tubes 32, 33. The chambers 39, 40 are separated from one another by a separating element 41.

Figure 11:
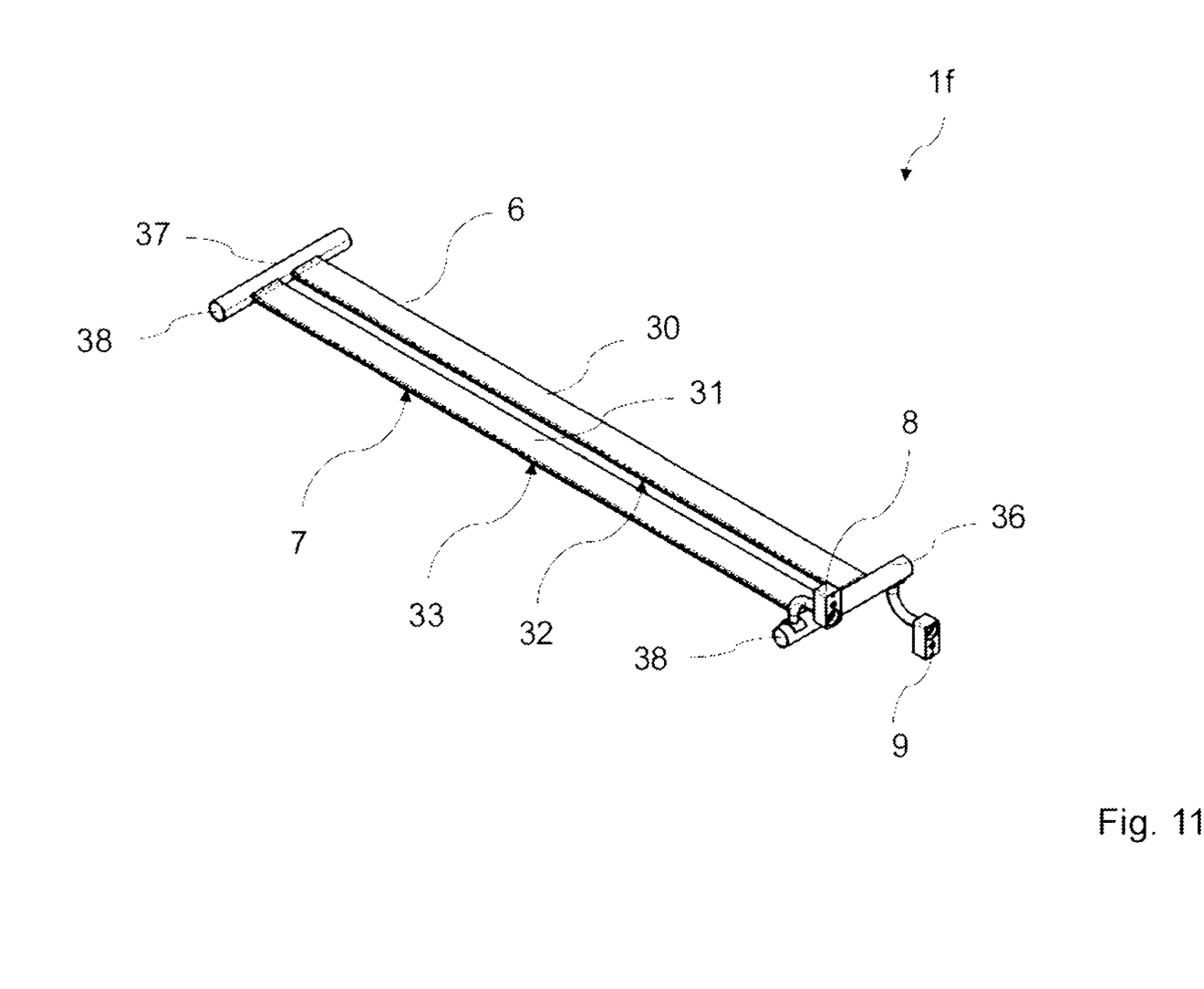
FIG. 11: a perspective view of the sixth exemplary embodiment shown in FIG. 10 of the device for the transfer of heat; as well as FIG. 12: a schematic exploded view of a refinement of the sixth exemplary embodiment of the device for the transfer of heat.

The pair of flat tubes 30, 32 having planar contact with one another is arranged apart from the pair of flat tubes 31, 33 having planar contact with one another.

Figure 12:
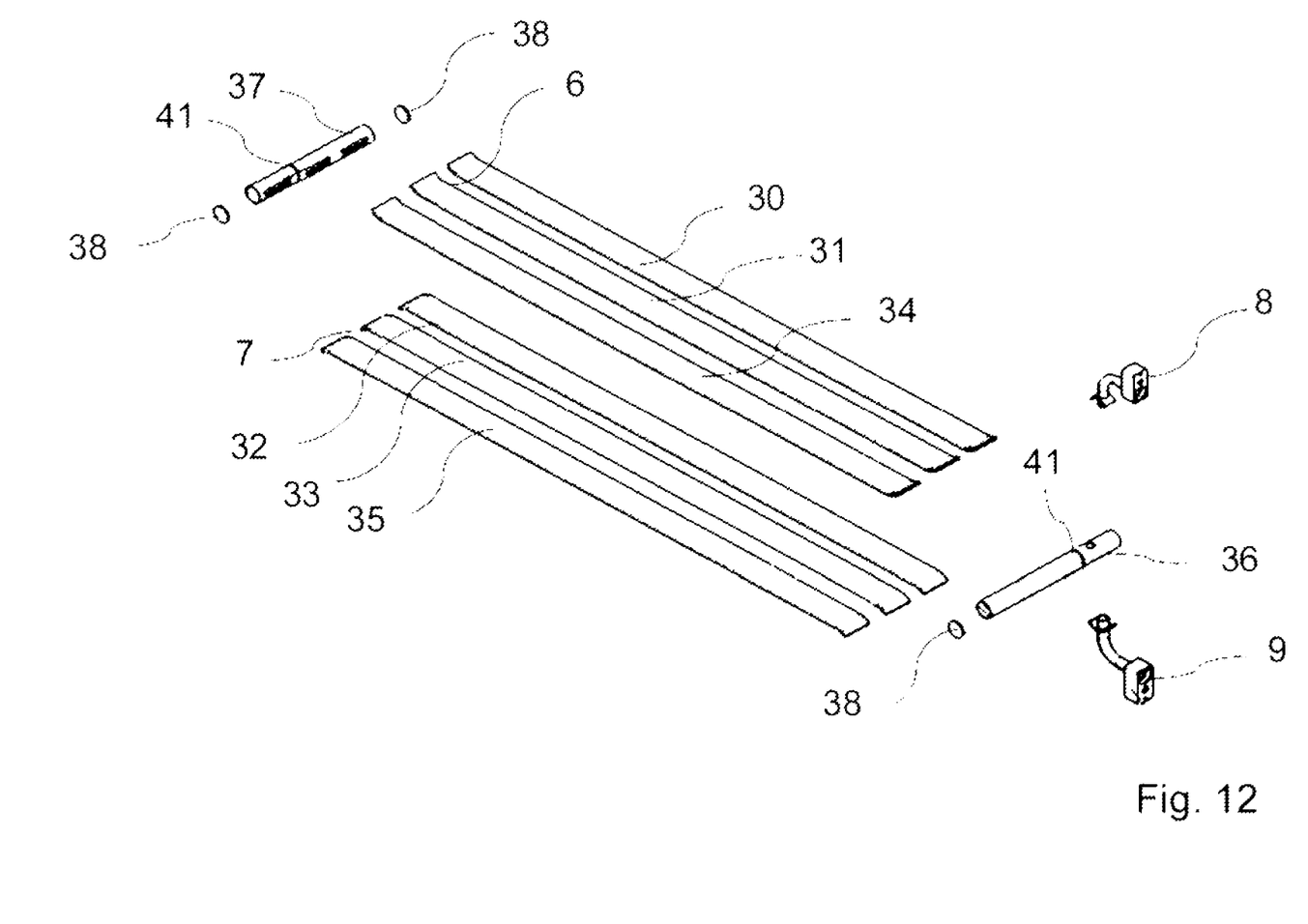

FIG. 12 shows a schematic exploded view of a further embodiment of device 1*f* from FIG. 9, 10, or 11. With the embodiment according to FIG. 12, the at least two fluid-conducting plate-shaped heat exchanger elements 6, 7 are each extended with at least one further and thus third flat tube 34, 35. In doing so, the first collector 36 and the second collector 37 are formed, for example, correspondingly longer. Fluid-tight areas are provided within the collectors 36, 37 by means of separating elements 41 arranged within the collectors 36, 37 in order to form a desired flow path for the fluid. In this manner, a parallel flow or a counterflow of the fluid can be provided by means of flat tubes 30, 31, 32, 33, 34, 35 of the plate-shaped heat exchanger elements 6, 7.

LIST OF REFERENCE NUMERALS

1', 1*a*, 1*b*, 1*c*, 1*d*, 1*e*, 1*f* Device
2 Battery
3 Inlet
4 Outlet
5 Heat exchanger
6 First plate-shaped heat exchanger element
7 Second plate-shaped heat exchanger element
8 Inlet
9 Outlet
10 Fluid connection 11 Heat transfer surface
12 Heat transfer surface
13 Increase
14 Increase
15 Increase
16 First plate
17 Second, middle plate
18 Third plate
19 Passage
20 Passage
21 Outlet port
22 Inlet port
23, 24, 26, 27 Fluid flow
25 Fluid connection
28, 29 Fluid connection
30, 31, 32, 33, 34, 35 Flat tubes
36 First collector
37 Second collector
38 End elements
39 First chamber
40 Second chamber
41 Separating element

What is claimed is:

1. A device for transferring heat to control the temperature of batteries and components of power electronics, comprising:
    an inlet for a fluid and an outlet for the fluid; and
    at least two fluid-conducting plate-shaped heat exchanger elements, of which a first plate-shaped heat exchanger element and a second plate-shaped heat exchanger element have planar contact with one another for the transfer of heat, wherein the second plate-shaped heat exchanger element is formed for planar contact with a heat transfer surface of a battery and/or of a component of power electronics, wherein at least one fluid connection is formed between the first plate-shaped heat exchanger element and the second plate-shaped heat exchanger element such that fluid escaping from the first plate-shaped heat exchanger element can flow through the second plate-shaped heat exchanger element, wherein the first plate-shaped heat exchanger element and the second plate-shaped heat exchanger element are formed from three profiled plates, which are flatly arranged with respect to one another and are connected to one another at least on the edge in a fluid-tight manner, wherein the profiles of the plates form hollow cavities as fluid flows between the plates, wherein the fluid enters the first plate-shaped heat exchanger element via the inlet, and flows from the first plate-shaped heat exchanger element into the second plate-shaped heat exchanger element through the fluid connection, and then exits the second plate-shaped heat exchanger element via the outlet, wherein the fluid connection between the flatly contacted plate-shaped heat exchanger elements is formed such that the fluid within a fluid flow in the first plate-shaped heat exchanger element is directed in parallel flow in the same direction as a fluid flow in the second plate-shaped heat exchanger element, wherein the first plate-shaped heat exchanger element is formed from a first plate and a second plate, and the second plate-shaped heat exchanger element is formed from the second plate and a third plate, and wherein the inlet for the fluid is formed with a passage by means of the second plate and the third plate so that an entire amount of the fluid entering through the inlet flows into the first plate-shaped heat exchanger element, and the outlet for the fluid is formed with a passage only by means of the third plate.

2. The device according to claim 1, wherein the inlet of the fluid and the outlet of the fluid are arranged on a common side of the plate-shaped heat exchanger elements having planar contact with one another.

3. The device according to claim 1, wherein a fluid flow in the first plate-shaped heat exchanger element and a fluid flow in the second plate-shaped heat exchanger element are each formed as a channel, which has a U shape.

4. The device according to claim 1, wherein a fluid flow in the first plate-shaped heat exchanger element is formed with turbulators and/or conductive elements such that a uniform distribution of the fluid is ensured in the first plate-shaped heat exchanger element.

5. The device according to claim 4, wherein a fluid flow in the second plate-shaped heat exchanger element is formed with turbulators and/or conductive elements such that a uniform distribution of the fluid is ensured in the second plate-shaped heat exchanger element.

6. The device according to claim 1, wherein the second plate-shaped heat exchanger element is formed with the heat transfer surface of a battery and/or of a component of power electronics through bonding, pressing, soldering, or sintering.

7. The device according to claim 1, wherein the inlet and the outlet for the fluid are arranged on a contact side with the heat transfer surface of a battery and/or of a component of power electronics at the second plate-shaped heat exchanger element.

* * * * *